US008661511B2

(12) United States Patent
Kase (10) Patent No.: US 8,661,511 B2
(45) Date of Patent: Feb. 25, 2014

(54) APPARATUS REGISTRATION METHOD AND SERVER DEVICE (75) Inventor: Hiroshi Kase, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/388,127

(22) PCT Filed: Oct. 26, 2010

(86) PCT No.: PCT/JP2010/006320
§ 371 (c)(1),
(2), (4) Date: Jan. 31, 2012

(87) PCT Pub. No.: WO2011/070706
PCT Pub. Date: Jun. 16, 2011

(65) Prior Publication Data
US 2012/0131649 A1 May 24, 2012

(30) Foreign Application Priority Data

Dec. 9, 2009 (JP) ................................. 2009-279153

(51) Int. Cl.
H04L 29/06 (2006.01)
(52) U.S. Cl.
USPC .............................. 726/4; 713/100; 709/223
(58) Field of Classification Search
None
See application file for complete search history.

(56) References Cited

U.S. PATENT DOCUMENTS

| 2003/0188320 | A1* | 10/2003 | Shing | 725/131 |
|---|---|---|---|---|
| 2005/0198357 | A1* | 9/2005 | Fujita | 709/232 |
| 2009/0033806 | A1 | 2/2009 | Yuasa | |
| 2009/0180617 | A1* | 7/2009 | Peterka | 380/277 |
| 2009/0307307 | A1* | 12/2009 | Igarashi | 709/203 |
| 2010/0036907 | A1* | 2/2010 | Douillet et al. | 709/203 |
| 2010/0077026 | A1 | 3/2010 | Watanabe et al. | |
| 2010/0138900 | A1* | 6/2010 | Peterka et al. | 726/4 |
| 2010/0185764 | A1* | 7/2010 | Kondo et al. | 709/225 |
| 2010/0281508 | A1* | 11/2010 | Poder et al. | 725/93 |
| 2010/0281534 | A1* | 11/2010 | Poder et al. | 726/15 |
| 2010/0313225 | A1* | 12/2010 | Cholas et al. | 725/62 |

(Continued)

FOREIGN PATENT DOCUMENTS

| JP | 2003-18668 | 1/2003 |
|---|---|---|
| JP | 2004-343445 | 12/2004 |

(Continued)

OTHER PUBLICATIONS

International Preliminary Report on Patentability issued Jul. 19, 2012 in International (PCT) Application No. PCT/JP2010/006320.

(Continued)

Primary Examiner — Jeffery Williams
(74) Attorney, Agent, or Firm — Wenderoth, Lind & Ponack, L.L.P.

(57) ABSTRACT

A method registers access permission from a first device to a second device over a network. When receiving via the network a connection request from the first device of which access permission is not registered, the second device rejects connection from the first device, and shifts to the first mode. In a first mode, the second device detects user's operation on the second device, and judges whether the detected user's operation is an operation regarding viewing of a reproduction signal from the second device. If the user's operation is not the operation regarding viewing, the second device shifts to the second mode for registering access permission. If the user's operation is the operation regarding viewing, the second device does not shift to the second mode.

16 Claims, 8 Drawing Sheets

(56) References Cited

U.S. PATENT DOCUMENTS

2011/0110271 A1* 5/2011 Arauz-Rosado ............. 370/255
2011/0307376 A1* 12/2011 Woxblom ...................... 705/39

FOREIGN PATENT DOCUMENTS

| | | |
|---|---|---|
| JP | 2008-257559 | 10/2008 |
| JP | 2009-194503 | 8/2009 |
| WO | 2006/112326 | 10/2006 |
| WO | 2010/021110 | 2/2010 |

OTHER PUBLICATIONS

International Search Report issued Nov. 22, 2010 in International (PCT) Application No. PCT/JP2010/006320.

* cited by examiner

APPARATUS REGISTRATION METHOD AND SERVER DEVICE

BACKGROUND OF INVENTION

1. Technical Field

The present invention relates to a device registration technology in so-called digital electric appliances such as televisions or recorders connected via a network.

2. Background Art

Recently, in a general household, an IP (Internet Protocol) network is widely spread, and televisions, recorders, and other electric appliances connectable to the IP network are sold and distributed widely.

The user can has an enhanced convenience by connecting these electric appliances to the IP network. For example, patent documents 1 and 2 disclose a technology in which a television and a recorder are connected via the IP network so that an image of GUI (graphical user interface) of the recorder can be displayed on the television via the IP network, or the contents stored in the recorder can be viewed on the television.

Hereinafter, the recorder or other device for presenting information such as contents and GUI is called a "server," and the television or other device for acquiring information from the server is collectively called a "client."

Generally, the server has a function to register preliminarily clients that are permitted to access the information stored in the server, and to refuse access from non-registered clients.

Figure 9:
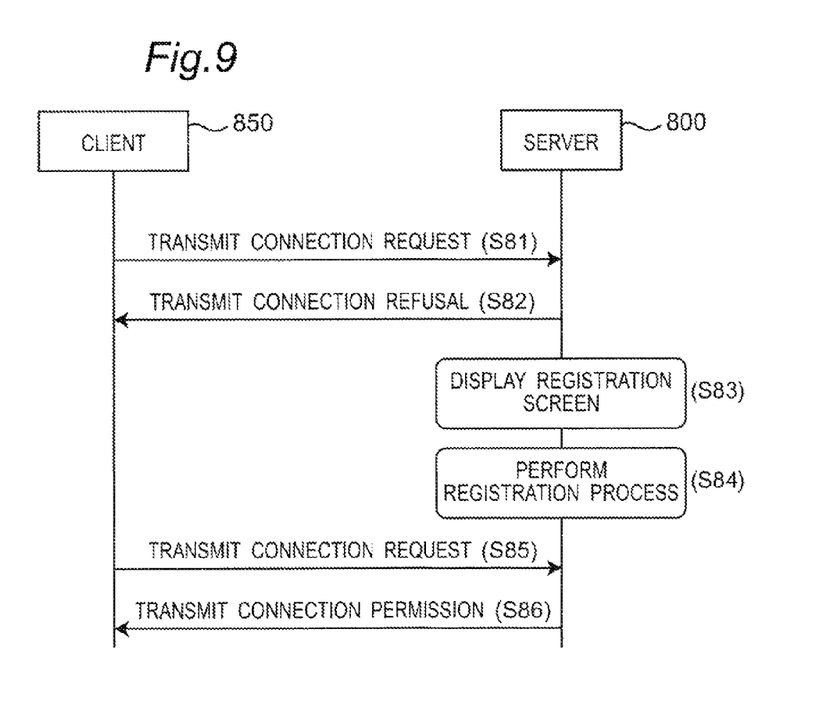
FIG. 9 is a diagram showing a sequence of registration process of a client in a conventional server.

Referring now to FIG. 9, the registration procedure of client access permission in a conventional server is described. The operation of the user is explained below in a case where the user attempts to connect a client 850 to a server 800 with the client 850 not registered in the server 800.

According to the user's operation, the client 850 sends a connection request to the server 800 (S81). The server 800, receiving the connection request, sends a connection refusal to the client 850 because the client 850 is not registered (S82). At the same time, the server 800 displays a registration screen for registering the client 850, on the screen of the server 800 (S83).

The user moves from a position at which the client 850 is located to a position at which the server is located, and executes a registration operation on the registration screen displayed on the server 800. This operation allows the client 850 to be registered in the server 800 (S84). Then, the user returns to the position at which the client 850 is located.

When the user attempts again to connect the client 850 to the server 800 from the client 850 in a state where the client 850 is completely registered in the server 800, the client 850 sends a connection request to the server 800 again (S85). At this time, since the client 850 has been already registered, the server 800 sends back a connection permission to the client 850 in response to the connection request from the client 850 (S86). By this procedure, the client 850 is allowed to use, that is, access the information stored in the server 800.

PRIOR ART DOCUMENT

Patent Documents

Patent document 1: JP2009-194503A
Patent document 2: WO2010/021110

SUMMARY OF INVENTION

However, when one user performs operation to register the client 850 to the server 800 in accordance with the conventional registration procedure mentioned above while the other user is viewing a program in the server 800, a registration screen shown in step S83 abruptly appears on the screen of the server 800 viewed by the other user. Sudden display of the registration screen not only surprises the viewing user, but also disturbs viewing by the user.

The present invention is devised to solve such problems, and it is hence an object thereof to present a device registration method and a server device capable of preventing an unintended screen which would be caused in registration process of a client device to a server device from being displayed and enhancing the user's convenience.

In a first aspect of the invention, a method of registering an access permission from a first device to a second device to the second device, in a network connected to the first device and the second device is provided. In the method, when the second device receives via the network a connection request from the first device of which access permission is not registered, the second device rejects connection from the first device, and shifts to the first mode. In the first mode, the second device detects user's operation on the second device, and judges whether the detected user's operation is an operation regarding viewing of a reproduction signal from the second device. If the user's operation is not an operation regarding viewing, the second device shifts to the second mode for registering an access permission from the first device to the second device. If the user's operation is an operation regarding viewing, the second device does not shift to the second mode.

In a second aspect, a server device connected to a client device via a network, capable of registering an access permission from the client is provided. The server device includes an input unit configured to receive an operation from the user, an interface unit configured to input/output data from/to the network, and a controller configured to control permission of an access to the server device. When the input unit receives a connection request from the client device of which access permission is not registered via the network, the controller sends a response to reject connection from the client device to the client device, and shifts the server device to the first mode. In the first mode, the controller detects user's operation on the server device, and judges whether the detected user's operation is an operation regarding viewing of a reproduction signal from the server device. If the user's operation is not an operation regarding viewing, the controller shifts the server device to the second mode for registering an access permission from the client device to the server device. If the user's operation is an operation regarding viewing, the controller does not shift the server device to the second mode.

According to the present invention, during registration process of access permission of the client device to the server device, viewing in the server device is not disturbed by a sudden display of an unintended screen, and the access permission can be registered (the device can be registered), and the device registration capable of enhancing the user's convenience can be realized.

DETAILED DESCRIPTION OF THE INVENTION

Referring now to the accompanying drawings, embodiments of the present invention are specifically described below.

Embodiment 1

1. Configuration

Figure 1:
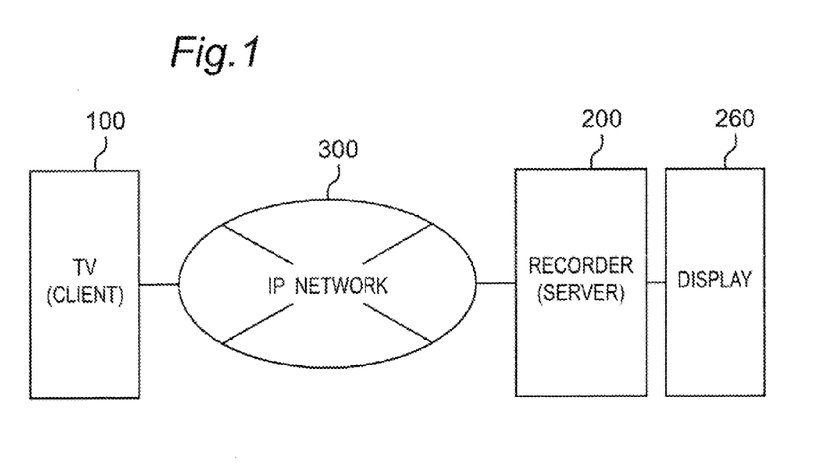
FIG. 1 is a diagram showing a network configuration in an embodiment of the present invention.

FIG. 1 is a diagram showing a network configuration in this embodiment of the present invention. A television 100 which is an example of a client and a recorder 200 which is an example of a server are connected to an IP network 300.

1.1 Television (Client)

Figure 2:
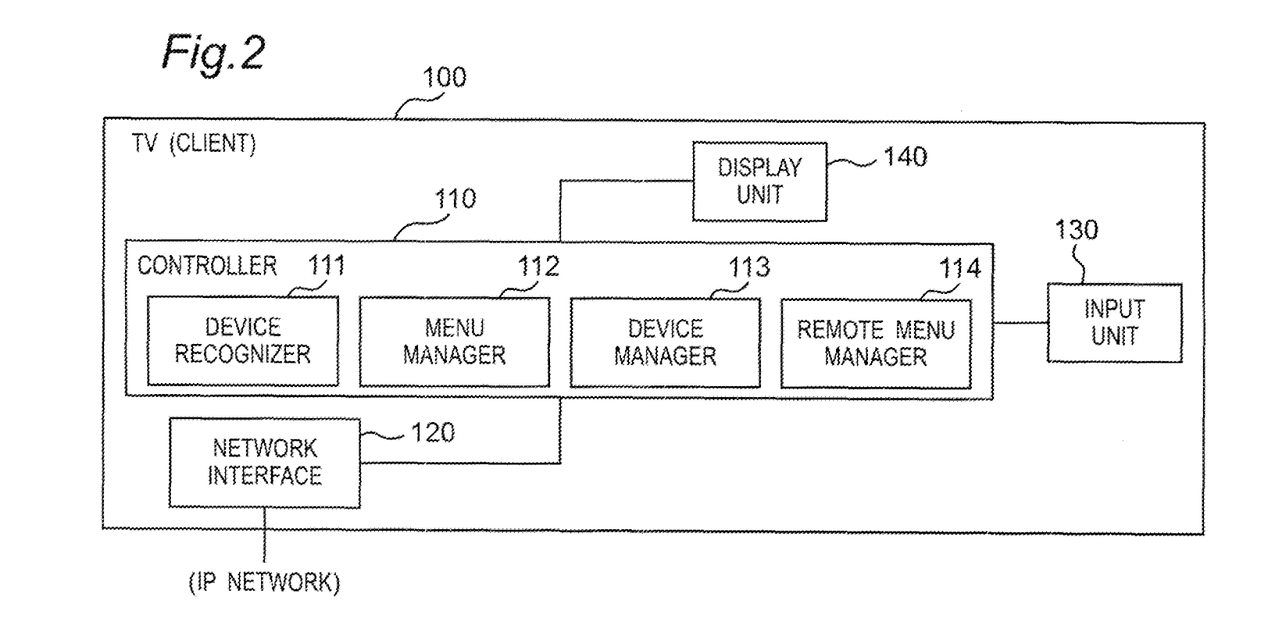
FIG. 2 is a block diagram showing a configuration of a television as a client in the embodiment.

FIG. 2 shows a configuration of the television. As shown in FIG. 2, the television 100 includes a controller 110, a network interface 120, an input unit 130, and a display unit 140.

The controller 110 processes in cooperation with the network interface 120, the input unit 130, and the display unit 140. The controller 110 is specifically composed of hardware including a CPU (central processing unit) and a memory, and a software program operating on the hardware. The cooperation of the hardware and the software realizes allows the controller 110 to function as a device recognizer 111, a menu manager 112, a device manager 113, and a remote menu manager 114.

The network interface 120 in cooperation with the controller 110 inputs/outputs data while connecting to an external network (herein, an IP network 300).

The input unit 130 in cooperation with the controller 110 receives inputs from a remote controller (not shown) or the like operated by the user.

The display unit 140 in cooperation with the controller 110 displays a screen corresponding to an instruction from the controller 110. More specifically, the display unit 140 is composed of an image processing processor, a memory, a display panel, and others.

1.2 Recorder (Server)

Figure 3:
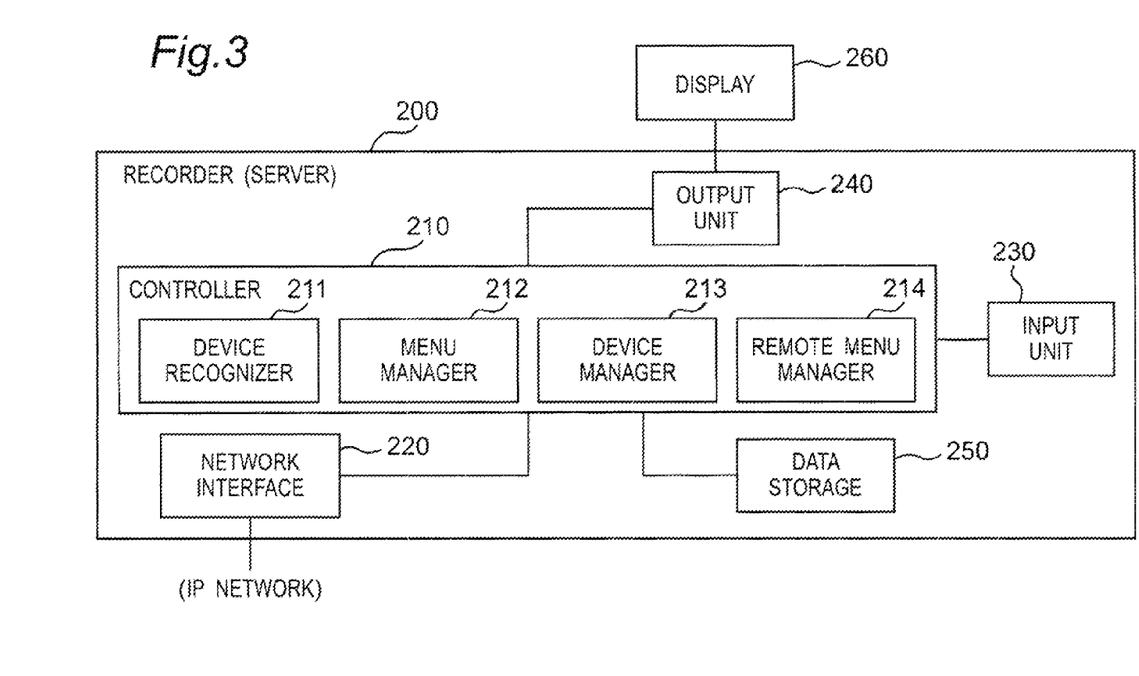
FIG. 3 is a block diagram showing a configuration of a recorder as a server in the embodiment.

FIG. 3 is a block diagram showing a configuration of a recorder as a server in Embodiment 1. As shown in FIG. 3, a recorder 200 includes a controller 210, a network interface 220, an input unit 230, an output unit 240, and a data storage 250.

The controller 210 processes in cooperation with the network interface 220, the input unit 230, the output unit 240, and the storage 250. The controller 210 is specifically composed of hardware including a CPU, a memory and others, and a software program operating on the hardware. The cooperation of the hardware and the software allows the controller 210 to function as a device recognizer 211, a menu manager 212, a device manager 213, and a remote menu manager 214.

The network interface 220 in cooperation with the controller 210 inputs/outputs data while connecting to an external network (herein, an IP network).

The input unit 230 in cooperation with the controller 210 receives inputs from a remote controller (not shown) or the like operated by the user.

The output unit 240 operates in cooperation with the controller 210, and is connected to an external display 260, and outputs information of display screen to a display 260 according to a command from the controller 210. Specifically, the output unit 240 is composed of an image processor, a memory, a audio/video output interface, and others.

The display 260 is herein disposed outside the recorder 200, but it may be integrated with the recorder 200. The display 260 is, for example, connected to the recorder 200 via an HDMI (High-Definition Multimedia Interface).

2. Operation 2.1 Device Recognition Procedure

A device recognition procedure of the television 100 and the recorder 200 connected via the IP network 300 is explained below.

The controller 110 of the television 100 has a device recognizer 111 realized by a software program, and can operate in conformity with a UPnP (Universal Plug and Play) protocol.

Similarly, the controller 210 of the recorder 200 has a device recognizer 211 composed of a software program, and can operate in conformity with a UPnP protocol.

Therefore, when the television 100 and the recorder 200 are individually connected to the IP network 300, the device recognizer 111 of the television 100 and the device recognizer 211 of the recorder 200 communicate with each other through the network interface 120, the IP network 300, and the network interface 220, and can discover and recognize the devices with each other.

2.2. Acquisition Process of DDD

An acquisition procedure of device description document (DDD) in the process of discovering and recognizing mutually the devices connected through the IP network 300.

The device recognizer 111 of the television 100 requests a DDD in a format of HTTP (HyperText Transfer Protocol) from the device recognizer 211 of the recorder 200. The device recognizer 211 of the recorder 200 sends the DDD stored in the recorder 200 to the device recognizer 111 of the television 100, in response to the request from the device recognizer 111 of the television 100. Herein, the device recognizer 111 adds a header (called "client name header") for informing a character string (called "client name") expressing the name of television 100, to the HTTP header portion of the command for requesting acquisition of the DDD.

The client name is a character string determined by the user at a timing when installing the television 100, or the like, for example, "Television in Bed Room." When embedding the client name in the client name header, the client name may be encoded, as required, in a Base 64 format or the like.

The device recognizer 211 of the recorder 200 decodes the Base 64 format or the like, as required, and extracts the client name, when the client name header is added to the request from the device recognizer 111 of the television 100. Moreover, the device recognizer 211 also extracts a MAC (Media Access Control) address of a source from which the request is transmitted, that is, the television 100, from an Ether packet to which the client name header is added, and transfers the extracted client name and the MAC address to the device manager 213.

The device manager 213 of the recorder 200 holds and manages the client name and the MAC address transferred from the device recognizer 211, by relating with the information showing whether the access permission to this client is registered already or not.

Herein, the access permission means that the recorder 200 as the server device permits supply of contents and other data, to the client device (herein, the television 100) indicated by the MAC address. In other words, when the access permission to the MAC address of the television 100 is already registered, the television 100 can utilize contents of the recorder 200, but cannot utilize if not registered.

The device manager 213 of the recorder 200 notifies the device recognizer 211 of non-registration when the access permission to the MAC address which is transferred from the device recognizer 211 is not registered, or of registration when the access permission is already registered, respectively.

The device recognizer 211, when non-registration is notified by the device manager 213, adds a header (hereinafter "non-registration notice header") for noticing non-registration to the HTTP header portion, when returning the DDD to the device recognizer 111 of the television 100. On the other hand, when registration is notified from the device manager 213, the device recognizer 211 returns the DDD without adding the non-registration notice header.

In the above example, the MAC address is extracted from the Ether packet, but acquisition of MAC address is not limited to this method. For example, similar to the client name header, a header notifying MAC address may be separately defined, and the MAC address may be notified to the device recognizer 211 from the device recognizer 111 through this header. In this case, the information to be notified is not limited to the MAC address, but may be a device unique ID (for example, UUID: Universally Unique IDentifier).

The DDD in Embodiment 1 includes at least the name of the recorder 200 (hereinafter called "server name"), the device unique ID, and initial URL (Uniform Resource Locator). Herein, the server name is a character string (for example, "Recorder in Living Room") determined by the user at the time of installation of the recorder 200, and the device unique ID is the MAC address or other device unique ID (for example, UUID). The initial URL, of which details are described below, is generally the URL to be accessed first by the television 100 for the recorder 200 when the user selects the recorder 200 on a menu of the television 100.

The device recognizer 111 acquires the DDD from the device recognizer 211 of the recorder 200 and then transfers the server name, the device unique ID, and the initial URL to the device manager 113, and the device manager 113 stores and manages these items of information.

By the procedure, the television 100 and the recorder 200 recognize with each other, and each one of devices stores and manages the name (client name or server name) and the MAC address (or device unique ID) of the other of devices.

Herein, an example of the case where one television 100 and one recorder 200 connected to the IP network is explained, but when a plurality of televisions 100 and/or a plurality of recorders 200 are connected on the IP network, the same processing is performed between each television 100 and each recorder 200. That is, each television 100 discovers and recognizes the plurality of recorders 200 connected on the IP network, and each recorder 200 discovers and recognizes the plurality of televisions 100 connected on the IP network.

In Embodiment 1, the device name (client name or server name) is input by the user, but acquisition of the device name is not limited to this method alone. For example, when shipping the product, a default device name (for example, "television" as client name, and "recorder" as server name) may be registered preliminarily. Alternatively, a plural device names (for example, "Television in Living Room" and "Television in Bed Room" as client name, "Recorder in Living Room" and "Recorder in Bed Room" as server name) may be registered in advance, and one of them may be selected by a user.

2.3 Device Selection Operation

Figure 4A:
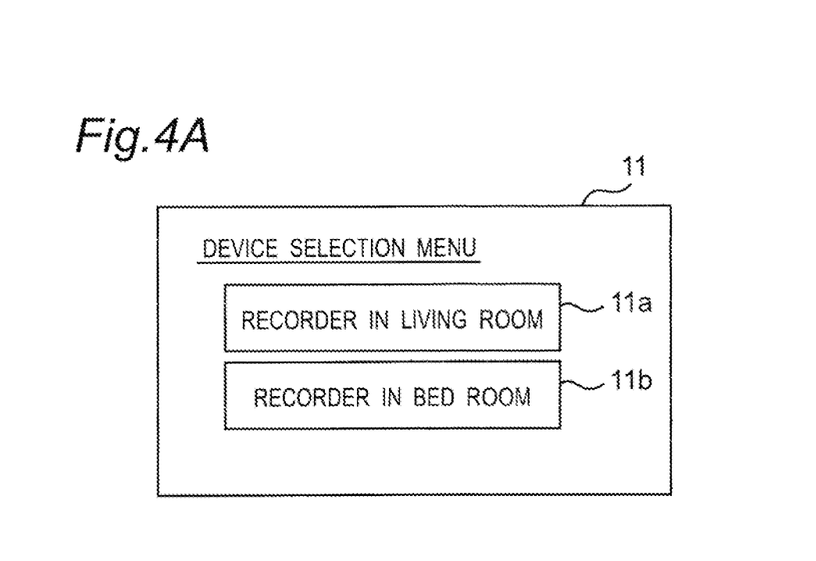
FIG. 4A is a diagram showing an example of device selection menu displayed on the television as the client in the embodiment.

The user must select a recorder to be connected on the television (client) when the user desires to reproduce the video or audio recorded in the recorder (server). A device selection operation for selecting one out of the plurality of recorders (servers) connected to the network, on the television (client) is explained. FIG. 4A is a diagram showing an example of device selection menu displayed on the television 100 as a client in Embodiment 1.

The controller 110 of the television 100 has a menu manager 112 is realized by a software program, and the menu manager 112 is responsible for generation, display, and management of menu screen to be displayed on a display unit 140.

In the television 100, when the device selection menu is requested to be displayed through the input unit 130 by the user with the remote controller (not shown) or the like, the menu manager 112 acquires the server name and the device unique ID stored and managed in the device manager 113 from the device manager 113, and displays the device selection menu 11 including the acquired server name on the display unit 140 as shown in FIG. 4A.

FIG. 4A shows that there are two servers (recorders) connected to the IP network 300 and the server names of two servers (recorders) are "Recorder in Living Room" and "Recorder in Bed Room", respectively. These server names are displayed as icon 11a and icon 11b, and the user can select either one of the icons by operating the remote controller or the like. The server's device unique ID is related to the corresponding server name, and is stored in the menu manager 112 of the television 100. In the following explanation, the recorder 200 to be selected is supposed to be "Recorder in Living Room" indicated by the icon 11a.

When the icon 11a (Recorder in Living Room) is selected by user's operation on the remote controller, in the television 100, the menu manager 112 acquires the initial URL related with the device unique ID corresponding to the server indicated by the selected icon 11a, from the device manager 113, and transmits the initial URL to the remote menu manager 114.

Herein, in the meantime, it is explained that the icon 11a and the initial URL are related through the device unique ID, but the method is not limited to this example. For example, when the device selection menu 11 is requested to be displayed by the user, the menu manager 112 may acquire the initial URL from the device manager 113, and store the initial URL and the icon 11a in the menu manager 112 with the initial URL and the icon 11a related with each other.

The controller 110 of the television 100 has the remote menu manager 114 is realized by a software program. The remote menu manager 114 receives the URL information of the access destination from the menu manager 112, and acquires a menu generation program from the site indicated by this URL, and executes the acquired menu generation program to display the menu of devices of the access destination on the display unit 140. Moreover, the remote menu manager 114 supplies the information obtained from the input unit 130 to the menu generation program, and communicates with the access destination, thereby updating the content of the menu to be displayed.

On the other hand, the controller 210 of the recorder 200 has a remote menu manager 214 is realized by a software program. This remote menu manager 214 stores and manages a menu generation program which is executed by the television 100 as the client device and is used for generating a menu screen to be displayed on the display unit 140 of the television 100, and a guide screen generation program for displaying warning or guide on the display unit 140 of the television 100.

The remote menu manager 214 of the recorder 200 receives an acquisition request for acquiring a menu generation program from the remote menu manager 114 of the television 100, and extracts a MAC address from the Ether packet of the acquisition request, and confirms whether the access permission to this MAC address is already registered in the device manager 213. If registered, the remote menu manager 214 transmits the menu generation program to the remote menu manager 114, and if not registered, the guide screen generation program is sent to the remote menu manager 114.

In the meantime, when a method of noticing the device unique ID in the HTTP header is employed, instead of acquiring the MAC address from the Ether packet, the device unique ID may be acquired from the HTTP header.

The foregoing process is more specifically described below. The menu generation program and the guide screen generation program are, for example, JavaScript (registered trademark) programs, and they are supposed to have names of "start1.js" and "start2.js", respectively. On the other hand, the initial URL described in the DDD of the recorder 200 is supposed to be "start.js" (herein, for the sake of simplicity, only the file name is shown, but the initial URL is usually described in a format including a path to the corresponding file). In this case, the remote menu manager 214 of the recorder 200 is required to acquire "start.js" from the remote menu manager 114 of the television 100.

When acquisition of start.js is requested from the remote menu manager 114, the remote menu manager 214 transmits a file of "start1.js", which is a menu generation program in response to the acquisition request of this start.js if the access permission of the television 100 to the remote menu manager 114 has been already registered. On the other hand, if the access permission of the television 100 is not registered, the remote menu manager 214 transmits a file of "start2.js", which is a guide screen generation program in response to the acquisition request of the start.js.

Figure 4B:
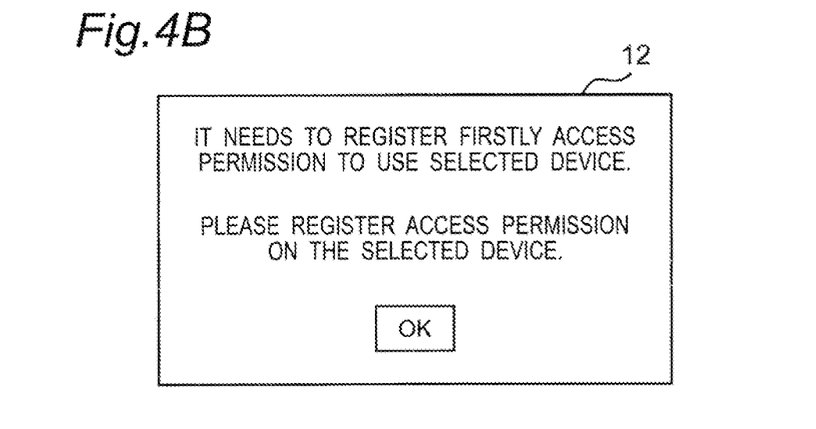
FIG. 4B is a diagram showing an example of a guide screen displayed on the television as the client in the embodiment.

In this mechanism, when the user selects the icon 11a indicating the recorder 200 on the device selection menu 11 (see FIG. 4A) displayed on the display unit 140 of the television 100, the following display appears on the display unit 140 of the television 100. In other words, when the access permission of the television 100 has been already registered in the recorder 200, a menu screen allowing an operation on the recorder 200 is displayed. On the other hand, when the access permission is not registered in the recorder 200, a guide screen (see. FIG. 4B) showing that the recorder 200 cannot be used via the television 100 is displayed on the television 100.

2.4 Registration Method of Access Permission

A registration method of access permission from the television (client) to the recorder (server) in this embodiment is described below.

Figure 5:
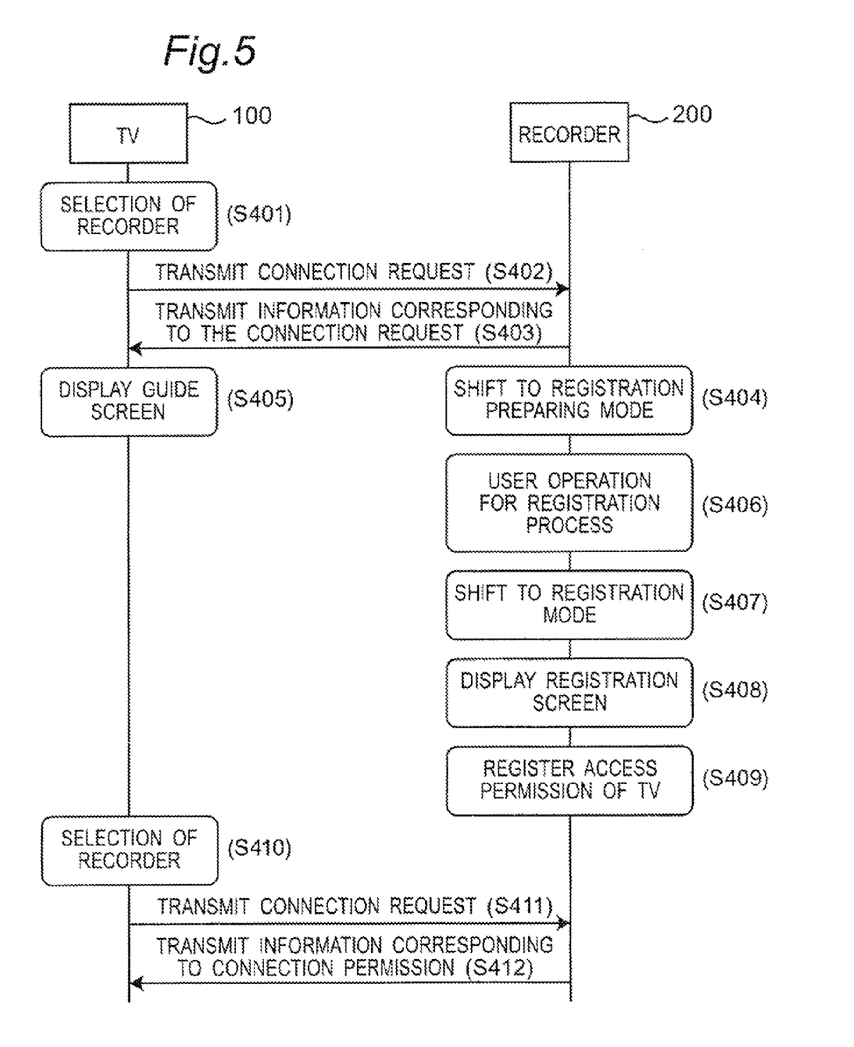
FIG. 5 is a diagram showing a sequence of registration procedure of access permission in Embodiment 1.

FIG. 5 is a diagram showing a sequence of registration procedure of access permission in Embodiment 1. In FIG. 5, before start of sequence, it is supposed that the access permission of the television 100 to the recorder 200 is not registered in a state of completion of the device recognition procedure mentioned above.

Referring now to FIG. 5, when the recorder 200 is selected by user's operation from the device selection menu 11 (see FIG. 4A) displayed on the display unit 140 of the television 100 in the method mentioned above (S401), the television 100 transmits a connection request to the recorder 200 (S402). This connection request is a request for acquiring a menu generation program from the initial URL mentioned above.

Since the access permission of the television 100 is not registered, the recorder 200 transmits information corresponding to connection refusal in response to the connection request (the request for acquiring a menu generation program) from the television 100 (S403). This information corresponding to connection refusal is the guide screen generation program mentioned above. At this time, the remote menu manager 214 of the recorder 200 shifts to a registration preparation mode (S404).

The display unit 140 of the television 100 displays a guide screen (S405) by a guide screen generation program acquired as information corresponding to the connection refusal (S405). This guide screen displays the guide information for the user, which informs that the user should register an access permission of the television 100 to the recorder 200, and displays the information such as its registration method. FIG. 4B shows an example of this guide screen. In addition, this guide screen may be also designed to be erased from the screen automatically which a specific time elapses after start of the display.

By referring to the guide screen as shown in FIG. 4B, the user can recognize that registration of access permission is necessary and that the operation for the registration should be performed on the recorder 200. Hence, the user moves to the location of the recorder 200 and executes the operation to the recorder 200 for registration of the access permission of the television 100.

The recorder 200 detects the operation executed by the user, and judges if the operation is an operation for registration of to permit access. Accordingly, when the user makes an operation for registration of the access permission of the television 100, the recorder 200 detects this operation (S406). The operation for registration of the access permission is more specifically described later.

In the registration preparation mode, when the user's operation for registration of access permission is detected through the input unit 230, the registration preparation mode is canceled, and is shifted to a registration mode (S407). In the registration mode, the remote menu manager 214 requests the menu manager 212 to display a registration screen for registering access permission (hereinafter called "access permission registration") (S408).

In this manner, in this embodiment, it is judged whether the user's operation made through the input unit 230 is an operation for registration of access permission or not. In the registration preparation mode, the user's operation made through the input unit 230 is an operation for registration of access permission, it is considered that a user has started registration process of access permission of the television 100 in the recorder 200. As a result, the user viewing a reproduction signal from the recorder 200 can recognize that the registration process of access permission has been started in the recorder 200.

Figure 6:
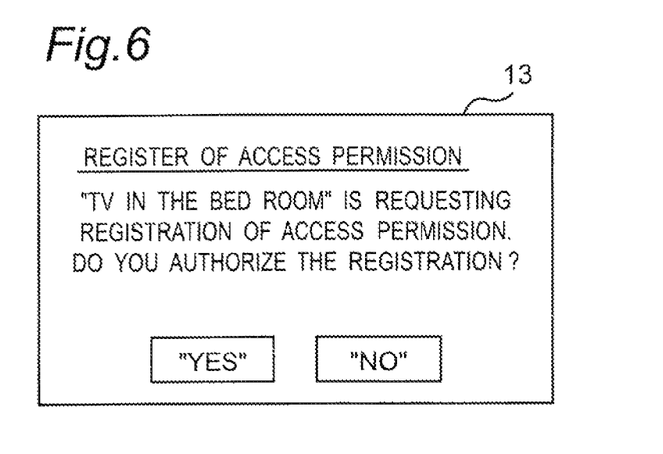
FIG. 6 is a diagram showing an example of access permission registration screen on a registration screen in Embodiment 1.

The menu manager 212 of the recorder 200 receives a request from the remote menu manager 214, and displays a registration screen, that is, an access permission registration screen on the display 260 through the output unit 240 (S408). FIG. 6 shows an example of this registration screen, that is, the access permission registration screen 13.

In this manner, in the embodiment when operation for registration of access permission is made on the recorder 200 in the registration preparation mode, (in this case, it would be considered that the user who is viewing the reproduction signal from the recorder 200 admits that the viewing is temporarily stopped and registration process starts), the registration screen for access permission registration is displayed. As a result, the user who is viewing the reproduction signal from the recorder 200 is prevented from being interrupted in viewing by force.

In succession, the menu manager 212 waits for user's operation on the access permission registration screen 13 as shown in FIG. 6, that is, operation for "Yes" or "No" or the like. More specifically, the menu manager 212 detects an input of remote controller or the like through the input unit 230 to detect the user's operation.

When the menu manager 212 of the recorder 200 detects the user's operation showing registration (in this example, selection of "Yes" on the access permission registration screen 13), the menu manager 212 request the device manager 213 to register an access permission of the television 100. The device manager 213 receives the request from the menu manager 212, and then registers the access permission of the television 100 (S409). As a result, the registration process of access permission of the television 100 on the recorder 200 is completed. Herein, the user moves to a place in which the television 100 is located for viewing the television 100 after completion of operation for access permission at the recorder 200.

In this example, as shown in FIG. 6, the registration screen is prepared so that the device to which access permission is provided is preliminarily displayed on the registration screen (Television in Bed Room) and permission/non-permission is selected by "Yes" or "No". However the registration screen may be compiled so that a list of candidates of devices to which access permission are provided is displayed for allowing the user to select one of the devices.

By this procedure, registration of access permission from the television 100 to the recorder 200 is completed. Thereafter, when the reorder 200 is selected by the user on the device selection menu 11 displayed on the television 100 (S410) and a connection request is sent from the television 100 to the recorder 200 (S411), information corresponding to connection permission is transmitted from the recorder 200 to the television 100, in response to the connection request (S412).

Herein, the "connection request" at step S411 is same as the "connection request" at step S402. Further, the information corresponding to the connection permission transmitted at step S412 is the menu generation program mentioned above. Therefore, when the television 100 receives the information corresponding to the connection permission, the display unit 140 of the television 100 displays an operation screen of the recorder 200. With this operation screen, the user can utilize functions of the recorder 200 from the television 100, or view contents stored in the data storage 250 of the recorder 200.

Moreover, if the user's operation for registration is not detected at step S406 in lapse of a specified time after shift to the registration preparation mode at step S404, the remote menu manager 214 cancels the registration preparation mode.

In the state of cancellation of registration preparation mode, if the user's operation for registration is detected at step S406, the remote menu manager 214 does not request the menu manager 212 to display registration screen. Therefore, when a specified time passes after shift to the registration preparation mode at step S404, automatically, the access permission registration process from the television 100 is canceled. Similarly, if the user does not make an operation on the same registration screen within a specified time after display of registration screen at step S408, display of the registration screen may be erased. Further, upon lapse of a specified time after shift to the registration mode at step S407, the registration mode may be canceled automatically.

The specified time may be set freely. For example, the specified time is preferably determined in consideration of the distance between the television 100 and the recorder 200 located in the house (for example, whether the television 100 and the recorder 200 are located in the same room or not) or the duration required by the user for registration operation. The specified time is preferably same as or similar to the time of automatic erasure of the guide screen displayed at step S405.

In this manner, even in the case where the user has started the registration process for access permission from the television 100 but the operation is interrupted and a certain time has passed, the registration process of access permission is canceled automatically after lapse of the specified time. Accordingly, when the user operates the recorder 200 next time, the registration screen is not displayed thus enhancing the user's convenience.

The user's operation for registering access permission performed at step S406 is an operation regarding viewing of reproduction signal from the recorder, and includes, for example, the following operations:

1) Operation to turn on the power (main power) of the recorder 200 when the recorder 200 is in power OFF state (more precisely, the sub-power is in ON state inside the recorder, but apparently the main power appears to be in OFF state);

2) Operation other than operation expected to be used for viewing the recorder 200 when the recorder 200 is in reproduction state (the state of output of video signal or audio signal) (that is, when a user other than the user attempting to register an access permission is viewing broadcast or the recorded content in the recorder 200). Herein, the operation expected to be used for viewing the recorder 200 includes, for example, operation of volume control, operation of screen setting such as adjustment of brightness or color tone, or operation for fast-forwarding or rewinding.

As described herein, according to the embodiment, in the method of registering the access permission from the television to the recorder 200, to the recorder 200 in the IP network 300 connected to the television 100 and the recorder 200, when receiving a connection request from the television 100, which is not registered access permission, through the IP network 300, the recorder 200 rejects the connection request from the television 100 and moves to a registration preparation mode (first mode). In the registration preparation mode, the recorder 200 detects the user's operation on the recorder 200 and judges whether the detected user's operation is an operation regarding viewing of reproduction signal from the recorder 200. If the user's operation is not an operation regarding viewing, the recorder 200 shifts to a registration mode (second mode) for registering access permission from the television 100 to the recorder 200. On the other hand, if the user's operation is an operation regarding viewing, the recorder 200 does not shift to the registration mode.

With the above mentioned configuration, even when a certain user is enjoying viewing of the recorder 200 and another user requests registration of access permission from the television 100 through the network 300, the registration screen is not displayed unless an operation for interrupting viewing is attempted on the recorder 200. Hence, viewing of the user who is enjoying viewing of reproduction signal from the recorder 200 is not interrupted by force, thus enhancing user's convenience.

Embodiment 2

Another example of registration method of access permission is explained below. In the registration method of access permission in Embodiment 1, the registration screen is displayed on the recorder 200, and the user performs the registration process on the recorder 200 to register the access permission. By contrast, according to the registration method of access permission in this embodiment, a guide screen is displayed on the recorder 200, and then the user performs a registration process on the television 100 so that the registration of access permission is completed. By referring to FIG. 7, the sequence of registration process of access permission in Embodiment 2 is described specifically below.

Figure 7:
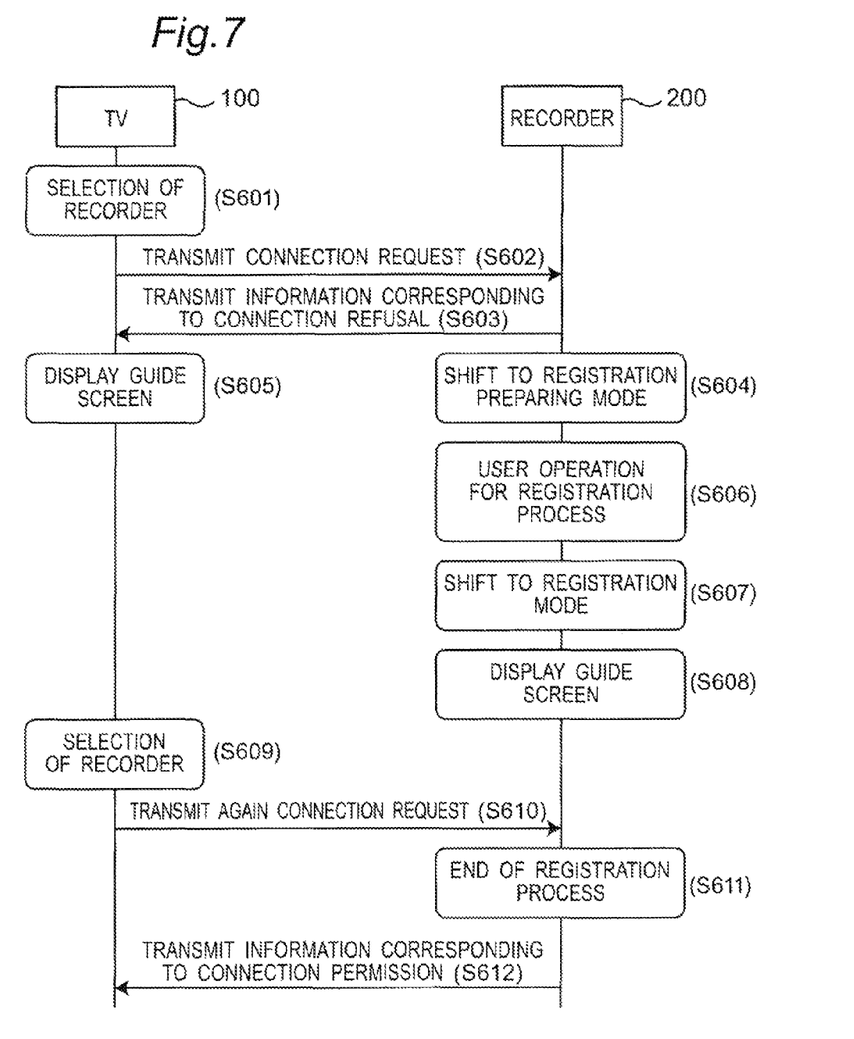
FIG. 7 is a diagram showing a sequence of registration procedure of access permission in Embodiment 2.

In FIG. 7, step S601 to step S606 are same as step S401 to step S406 in FIG. 5 of Embodiment 1, and thus specific description of these operations is omitted. In the following explanation, particularly, the operation after execution of user's operation for registration at step S606 and cancellation of the registration preparation mode, that is, the operation at step S607 to step S612 is explained. At this time, the user refers to the guide screen (see FIG. 4B) displayed on the television 100 at step S605 and then moves to the place in which the recorder 200 is located.

At step S606, when the user's operation for registration is detected (that is, when the detected operation is judged as an operation for registration), the remote menu manager 214 of the recorder 200 cancels the registration preparation mode and shifts to the registration mode (S607). Preferably, this registration mode may be canceled automatically upon elapse of a specific time after shift to the registration mode. Before shift to the registration mode, it may be designed to display a confirmation screen on the display 260 for allowing the user to confirm whether or not to register the access permission.

Figure 8:
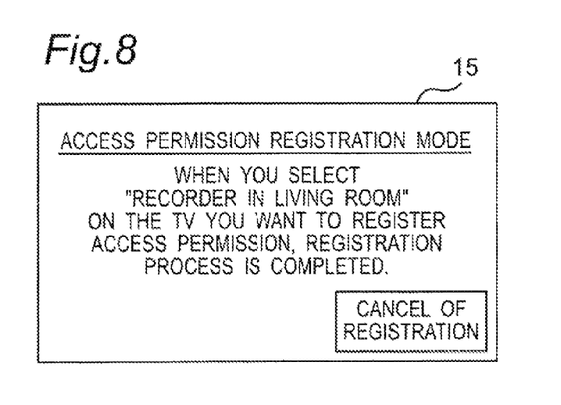
FIG. 8 is a diagram showing an example of a guide screen of "access permission registration mode" in Embodiment 2.

The remote menu manager 214 of the recorder 200 requests the menu manager 212 to display a guide screen showing the user a process necessary for registering the television 100 to the recorder 200 (S608). As a result, a guide screen of access permission registration mode is displayed on the display 260. FIG. 8 shows an example of this guide screen (guide screen 15 of access permission registration mode).

By referring to the guide screen 15 of access permission registration mode displayed on the display 260, the user can recognize that it is necessary to perform an operation for selecting a device (recorder) on the television 100 side. The user returns to the place in which the television 100 is located from the place in which the recorder 200 is located, and displays the device selection menu 11 (see FIG. 4A) on the display unit 140 of the television 100, and selects a device or a recorder desired to obtain access permission on the device selection menu 11. In this embodiment, the icon 11a showing "Recorder in Living Room" is selected. When detecting the user's operation of selecting the recorder 200 (S609), the television 100 transmits a connection request to the recorder 200 (S610).

The remote menu manager 214 of the recorder 200 extracts a MAC address from the Ether packet of the connection request transmitted from the television 100, and requests the device manager 213 to register an access permission to the device corresponding to this MAC address, that is, to the television 100. Instead of using the MAC address, as mentioned above, it may be designed to make use of the notice of the device unique ID by utilizing the HTTP header.

When the device manager 213 completes registration process of access permission on the television 100 (S611), the remote menu manager 214 cancels the registration mode, and transmits information corresponding to the connection permission (menu generation program) to the television 100 (S612).

In this manner, together with registration of access permission of the television 100, transmission of menu generation program as information corresponding to the connection permission is completed. As a result, an operation screen of the recorder 200 is displayed on the display unit 140. This operation screen allows the user to utilize the function of the recorder 200 from the television 100 or view the contents stored in the data storage 250 of the recorder 200.

As explained herein, in Embodiment 2, when receiving a connection request from the television 100 which is not registered access permission, the recorder 200 shifts to the registration preparation node, and waits for user's operation for access permission registration. Thereafter, when detecting user's operation for access permission registration, the recorder 200 shifts from the registration preparation mode to the registration mode, and displays a guide screen (see FIG. 8) for prompting operation for device selection on the television 100 side for access permission registration. When the user operation for registering the access permission (selecting the recorder) is performed on the television 100 side and the recorder 200 receives a registration request from the television 100, the recorder 200 performs the access permission registration. In this manner, the recorder 200 completes registration of access permission when receiving the connection request from the same television as the television from which the connection request is received first after display of the guide screen. As a result, it is possible to prevent registration of access permission by mistake in the recorder, for the television different from the television actually desired to be registered by the user.

The present invention is very useful for device registration and user interface to be displayed in a television, a recorder, or other digital electric appliance connected via a network.

DESCRIPTION OF THE REFERENCE SIGNS

100 Television
110 Controller
111 Device recognizer
112 Menu manager
113 Device manager
114 Remote menu manager
120 Network interface
130 Input unit
140 Display unit
200 Recorder
210 Controller
211 Device recognizer
212 Menu manager
213 Device manager
214 Remote menu manager
220 Network interface
230 Input unit
240 Output unit
250 Data storage
260 Display

The invention claimed is:

1. A device registration method of registering an access permission from a first device to a second device, in a network connected to the first device and the second device, the device registration method comprising:

determining that the second device receives via the network a connection request from the first device for which access permission is not registered;

shifting to a first mode based on a determination that the second device receives via the network the connection request from the first device of which access permission is not registered;

the second device, in the first mode, detecting user's operation on the second device, and judging whether the detected user's operation is an operation regarding viewing of a reproduction signal from the second device; and the second device, shifting to a second mode for registering the access permission from the first device to the second device based on a judgment that the user's operation is not an operation regarding viewing and not shifting to the second mode based on a judgment that the user's operation is an operation regarding viewing.

2. The device registration method according to claim 1, wherein in the second mode, the second device displays a registration screen for registering the access permission from the first device to the second device, and registers the access permission according to the user's operation on the registration screen.

3. The device registration method according to claim 1, wherein in the second mode, the second device registers the access permission when receiving a connection request again from the first device.

4. The device registration method according to claim 3, wherein in the second mode, the second device displays a guide screen for urging an operation on the first device for registering the access permission.

5. The device registration method according to claim 1, wherein the second device transmits information to the first device for displaying information indicating that the first device needs to register access permission from the first device to the second device, or a guide screen to present the information regarding a registration method of access permission to the user, when receiving a connection request from a non-registered first device through the network.

6. The device registration method according to claim 1, wherein the first mode is canceled when the operation regarding viewing is not detected within a specified time after shift to the first mode.

7. The device registration method according to claim 1, wherein the second mode is canceled when a specified time passes after shift to the second mode.

8. The device registration method according to claim 1, wherein the operation regarding viewing includes at least one of operation for sound volume control, operation for screen setting, fast-forward operation, and rewind operation.

9. A server device connected to a client device via a network, capable of registering an access permission from the client to the server device, comprising:

an input unit configured to receive an operation from the user;

an interface unit configured to input data to and output data from the network;

a controller configured to control permission of an access to the server device; and a non-transitory memory storing a program, the program having instructions that are executable by the controller, wherein the controller executes the instructions of the program and is configured to:

determine that the input unit receives a connection request from the client device for which access permission is not registered, sends a response to reject connection from the input unit to the client device, and shift the server device to a first mode based on the determination that the input unit receives the connection request from the client device of which access permission is not registered via the network, in the first mode, the controller detects user's operation on the server device, and judges whether the detected user's operation is an operation regarding viewing of a reproduction signal from the server device, the controller shifts the server device to a second mode for registering the access permission from the client device to the server device based on a judgment that the user's operation is not an operation regarding viewing, and the controller does not shift the server device to the second mode based on a judgment that the user's operation is an operation regarding viewing.

10. The server device according to claim 9, wherein, in the second mode, the controller displays a registration screen for registering the access permission from the client device to the server device, and registers the access permission according to the user's operation on the registration screen.

11. The server device according to claim 9, wherein, in the second mode, the controller registers the access permission when receiving a connection request again from the client device.

12. The server device according to claim 11, wherein, in the second mode, the controller displays a guide screen for urging an operation on the client device for registering the access permission.

13. The server device according to claim 9, wherein the controller transmits information to the client device for displaying information indicating that the client device needs to register access permission from the client device to the server device, or a guide screen to present information regarding a registration method of access permission to the user, when receiving a connection request from a non-registered first client device through the network.

14. The server device according to claim 9, wherein the controller cancels the first mode when the operation regarding viewing is not detected within a specified time after shift to the first mode.

15. The server device according to claim 9, wherein the controller cancels the second mode when a specified time passes after shift to the second mode.

16. The server device according to claim 9, wherein the operation regarding viewing includes at least one of operation for sound volume control, operation for screen setting, fast-forward operation, and rewind operation.

* * * * *